United States Patent [19]

Nakaya et al.

[11] 4,236,481
[45] Dec. 2, 1980

[54] MEASURING INSTRUMENT

[75] Inventors: Tadao Nakaya; Takashi Kobashi, both of Utsunomiya, Japan

[73] Assignee: Kabushiki Kaisha Mitutoyo Seisakusho, Tokyo, Japan

[21] Appl. No.: 41,472

[22] Filed: May 22, 1979

[30] Foreign Application Priority Data

May 22, 1978 [JP] Japan .............................. 53-68887[U]

[51] Int. Cl.³ .......................... G01B 5/02; G01B 5/06; G01B 5/08
[52] U.S. Cl. .................................. 116/292; 116/312; 33/147 T
[58] Field of Search ............... 116/292, 312, 294, 295, 116/313, 311; 33/147 R, 147 T, 147 J, 172 R; 279/1 Q, 102; 73/740, 387

[56] References Cited

U.S. PATENT DOCUMENTS

| | | | |
|---|---|---|---|
| 1,966,424 | 7/1934 | Ames | 33/172 R |
| 2,369,321 | 2/1945 | Stalker | 279/102 |

FOREIGN PATENT DOCUMENTS 231091 2/1944 Switzerland .............................. 73/387

OTHER PUBLICATIONS

Lufkin Rule Company, Brochure, Model 702 Dial Caliper, Mar. 1966.

*Primary Examiner*—Gerald Goldberg
*Assistant Examiner*—Denis E. Corr
*Attorney, Agent, or Firm*—Brisebois & Kruger

[57] ABSTRACT

A dial type indicator in which the zero point on a scale fixed to a rotatable tubular outer frame can be set to the position of the pointer by rotating the outer frame around a circular inner frame. An elastic element at one side of the inner frame is pressed against the inner peripheral face of the outer frame by compressing the element in the thickness direction of the inner frame, using a manually adjustable arrangement to compress the element and cause it to extend laterally. In this manner the inner and outer frames can be reliably fastened together without damage to the outer frame and the operability of the outer frame is improved.

10 Claims, 7 Drawing Figures

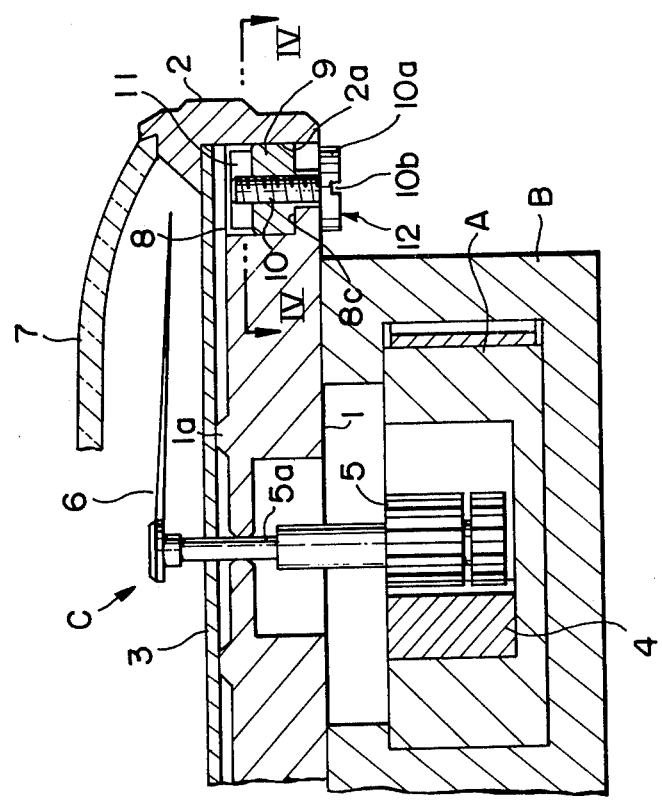

MEASURING INSTRUMENT

BACKGROUND OF THE INVENTION

The present invention relates to a measuring instrument in which, an inner frame supporting a pointer of a dial type indicator and an outer frame rotatably fitted on the inner frame and having attached thereto the scale plate of the dial type indicator, can be fastened together by compressively deforming an elastic element adjustably held in the inner frame, to thereby press it against the outer frame.

There are measuring instruments such as slide calipers and height gauges equipped with a dial type indicator. Such a dial type indicator has such a structure that an outer frame with a scale plate for a pointer is rotatably fitted around a circular inner frame rotatably supporting the pointer; and a zero point on the scale plate is set to the pointer by turning the outer frame with respect to the inner frame so as to effect zero ajustment.

In a conventional measuring instrument equipped with such a dial type indicator, a fixing means or locking means is provided to fix the outer frame against the inner frame to prevent rotation of the outer frame after zero adjustment, so that the zero position is not disturbed.

An example of such fixing means is disclosed, for example, in DIAL/VERNIER CALIPER GUIDE BOOK OF MITUTOYO CO. LTD. (1975, printed in U.S.A.). The guide book at page 9 illustrates a bezel clamp and bezel washer as the fixing means.

The bezel clamp includes a screw threaded into a plate or a ring of the inner frame. By tightening this screw, the bezel of the outer frame can be fixed to the inner frame by the bezel washer; and when said screw is loosened, the bezel can be rotated in relation to the inner frame. In such a fixing arrangement, when the bezel is fixed to the inner frame, the bezel washer pressed against the bezel, and the surface of bezel or the bezel washer are liable to be damaged. Since the bezel clamp and the bezel washer extend beyond the bezel, the bezel is sometimes hard to rotate for zero adjustment.

SUMMARY OF THE INVENTION

The first object of the present invention is to provide a measuring instrument in which the outer frame can be prevented from damage by fixing the outer frame to the inner frame by means of an elastic piece which can be compression-deformed by compressing means attached to the inner frame and which can be pressed against the outer frame.

The second object of the present invention is to provide a measuring instrument in which the compressing means consists of a bolt running through the inner frame in its thickness direction, and a nut to engage the bolt, and the elastic element is held between the nut and the inner frame, and in which these clamping means are set close to the outer frame but they do not jut out beyond the outer frame and thus they do not hinder the rotation of the outer frame for zero adjustment.

The third object of the present invention is to provide a measuring instrument in which the head of the bolt is exposed so that the compressing means can be externally manipulated.

The fourth object of the present invention is to provide a measuring instrument in which the elastic piece and nut are installed in a groove of the inner frame which opens toward an inner peripheral face of the outer frame, thereby providing a thin clamp means in the thickness direction of the inner frame.

The fifth object of the present invention to provide a measuring instrument equipped with clamp means in which a pair of parallel outside surfaces of the nut are very close to a pair of parallel opposed surfaces of the groove, whereby the nut can move back and forth in the axial direction of the bolt but is prevented from rotating upon rotation of the bolt.

The sixth object of the present invention is to provide a measuring instrument equipped with a clamp means in which the periphery of the elastic piece is closely adjacent to the inside surface of the groove, whereby the elastic piece, when it is compression-deformed by the compressing means, is deformed to project toward the inner peripheral face of the outer frame.

The seventh object of the present invention is to provide a measuring instrument equipped with a clamp means in which the periphery of the elastic piece has the same cross-sectional shape as that of the groove, where the groove has an orthogonal sectional profile in the thickness direction of the inner frame, and the elastic element is set close to the inside face of the groove, whereby the amount of jutting deformation of said elastic piece toward the inner peripheral face of the outer frame when compression-deformed is enhanced.

The eighth object of the present invention is to provide a measuring instrument equipped with a clamp means in which a nut having the same cross-sectional shape as that of the groove is closely adjacent to the inside face of the groove, whereby the elastic piece is reliably deformed to extend toward the inner peripheral face of outer frame.

The ninth object of the present invention is to provide a measuring instrument equipped with a clamp means in which the outside face of the elastic piece facing the inner peripheral face of the outer frame is formed as an arc following the inner peripheral face of the outer frame, whereby said elastic piece, when compressed to deform in the thickness direction of the inner frame, has its entire outside face reliably brought into close contact with the inner peripheral face of outer frame.

The tenth object of the present invention is to provide a measuring instrument equipped with a clamp means in which the outside face of said nut facing the inner peripheral face of said outer frame is formed as an arc following the inner peripheral face of the outer frame, whereby the jutting deformation of the elastic piece, when compressed to deform toward the inner peripheral face of said outer frame is made more reliable than in the instrument of the ninth object.

These objects, features and advantages of the invention will become more apparent upon a reading of the following detailed specification and drawings.

BRIEF DESCRIPTION OF THE DRAWINGS

FIG. 3 is a partial view in section of the dial type slide calipers shown in FIGS. 1 and 2;

DETAILED DESCRIPTION OF THE PREFERRED EMBODIMENTS

Figure 1:
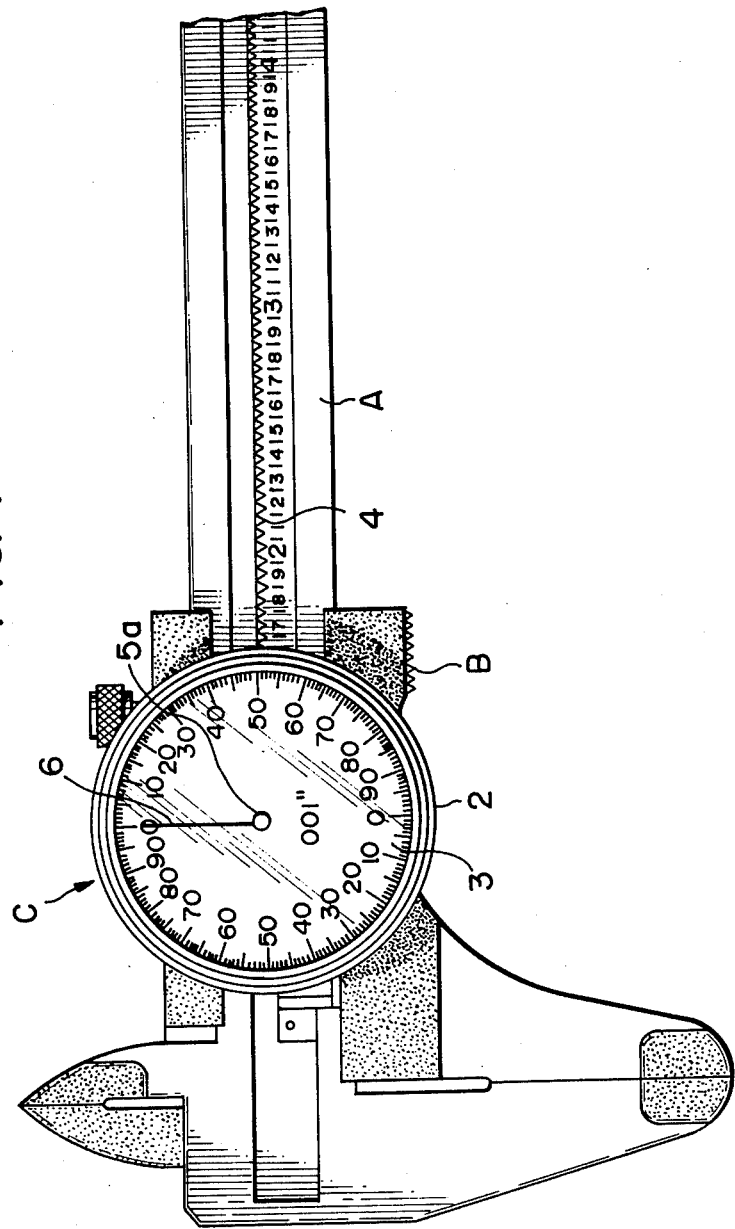
FIG. 1 is a partial plan view of a dial type slide calipers as an embodiment of the present invention.
Figure 2:
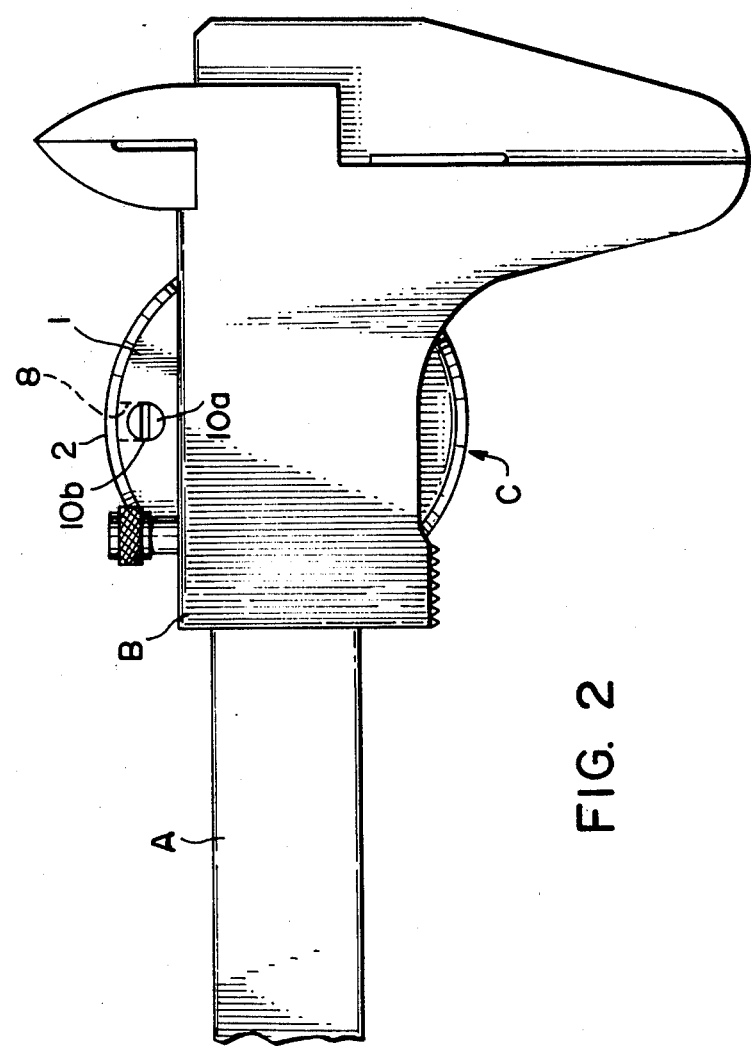
FIG. 2 is a bottom view of the dial type slide calipers illustrated in FIG. 1.

FIGS. 1 and 2 illustrate a dial type slide calipers in which A is the main beam of the calipers, and B is a slider attached to the main beam A to slide in the longitudinal direction of the latter.

Figure 4:
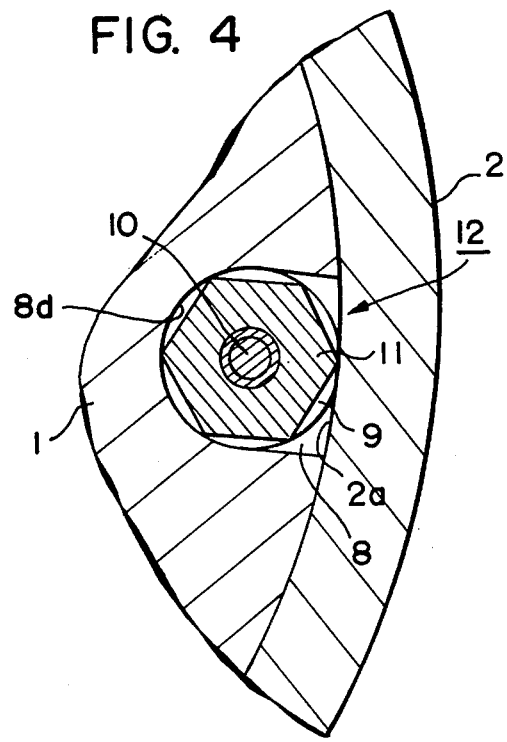
FIG. 4 is a sectional view along IV—IV of FIG. 3.

In FIGS. 3 and 4, 1 is a circular inner frame fixed to the slider B of the calipers; 2 is a tubular outer frame in the form of a ring or bezel rotatably fitted to the outer circular peripheral face of inner frame 1; 3 is a circular scale plate with scale indicia visible on its upper face, and its edge fixed to the inner peripheral face of the outer frame 2, and having its rear face in contact with a boss 1a of the inner frame 1; 4 is a rack fixed to the main bar A; 5 is a pinion meshing with rack 4 and having a shaft 5a; shaft 5a extends through the centers of the inner frame 1 and the scale plate 3 and is rotatably supported by the inner frame 1; 6 is a pointer fixed to the tip of the shaft 5a; and 7 is a transparent protective cover fitted to the outer frame ring 2, shielding the scale plate 3 and the pointer 6.

As shown at FIG. 4, a groove or recess 8 is formed in the top surface of inner frame 1. The recess is of U-shape, as viewed in plan at FIG. 4. The inner edge 8d of groove 8 is of semi-circular form and its side edges are generally parallel to each other and to a radius of inner frame which bisects the U-shape. Groove 8, as is evident from FIGS. 3 and 4, opens radially toward the inner peripheral face 2a of outer frame 2, and opens upwardly toward the rear face of scale plate 3. Groove 8 has a flat bottom surface 8c provided by a wall integral with inner frame 1 and which extends to the inner periphery of outer frame 2.

An elastic element 9 formed as a ring or plastic or synthetic resin is disposed in groove 8, a bolt 10 extends through a hole in the inner frame and the elastic ring 9, in the thickness direction of the inner frame 1 (i.e. in a direction parallel to the axis of shaft 5a), and 11 is a nut screwed to bolt 10. Bolt 10 and nut 11 constitute a compressing means 12 to compress and deform the elastic ring 9 in the thickness direction of the inner frame 1. The elastic element 9 is placed between nut 11 and the bottom surface 8c of groove 8.

As shown at FIGS. 2 and 3, the head 10a of bolt 10 is in a region between an edge of slider B and the outer periphery of outer frame 2.

The arrangement is such that the clamping means consisting of bolt 10, nut 11 and elastic ring 9 does not protrude beyond the outer peripheral face of the outer frame 2, and accordingly, the clamping means does not hinder the rotation of the outer frame 2 during zero adjustment.

Meanwhile, nut 11 and elastic element 9 in groove 8 provide a relatively thin clamping means in the thickness direction of the inner frame 1.

The head 10a of the bolt 10 is exposed on the rear surface of the dial type indicator C. Head 10a has a slot 10b formed to receive a screw-driver. By applying a screw-driver (not shown) to groove 10b, the bolt 10 can be externally rotated manually, with ease.

Half the periphery of the elastic ring 9 is in close contact with the semi-circular inside edge 8d of the groove 8. The inside edge 8d is spaced from the inner peripheral face of the outer frame 2. Thus with half the periphery of the elastic ring 9 in close contact with the inside edge 8d, the elastic ring 9, when compressed axially is deformed laterally to extend toward and engage the inner peripheral face 2a of the outer frame 2.

When the elastic ring 9 is not being deformed by the compressing means 12, there is a slight space between the elastic piece 9 and the inner peripheral face 2a of the inner frame 2.

In a measuring instrument of the above construction, while the elastic ring 9 is not compressed by the compressing means 12, the outer frame 2 is circumferentially rotatable relative to the inner frame 1, and by manually rotating the outer frame 2, the zero of the scale plate 3 can be set to the position of the pointer 6.

When the bolt 10 of the compressing means 12 is turned, the elastic ring 9 is compressed in the thickness direction of the inner frame 1 between the nut 11 and the bottom 8c of the groove 8 of the inner frame 1, the elastic ring 9 is deformed laterally and is pressed against the inner peripheral face 2a of the outer frame 2, thereby fixing the outer frame 2 to the inner frame 1. When, however, the compression of the elastic ring 9 is small, there is some friction between the ring and the outer frame 2 but the outer frame 2 can be rotated relative to the inner frame 1.

Figure 5:
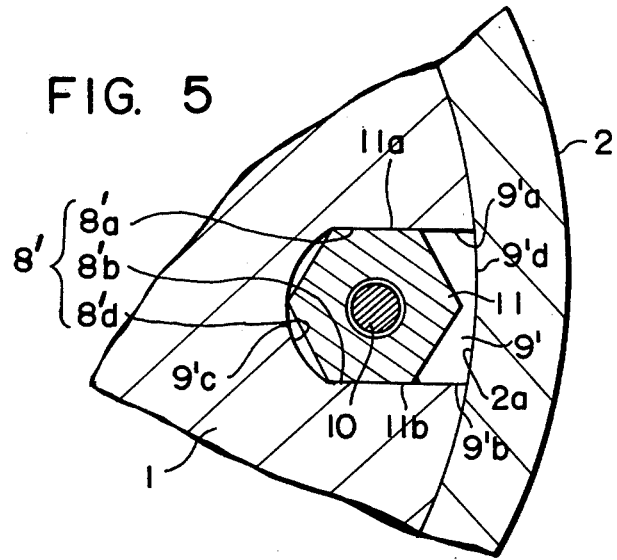
FIG. 5 is a veiw corresponding to FIG. 4 and illustrating another embodiment of the invention.

In the embodiment of FIGS. 1-4, the rotation of the nut 11 is not restricted and friction between the nut and the upper face of elastic ring 9 is relied on to prevent the nut from rotating when bolt 10 is turned. However, as shown in FIG. 5, a recess or groove 8' can be formed such that the parallel surfaces 11a, 11b of the nut 11 form a close fit with the parallel sides 8'a, 8'b of groove 8', thereby preventing rotation of the nut 11. In this embodiment, rotation of the bolt 10 will never cause the nut 11 to rotate and therefore the elastic element 9 can be compressed and released with reliability.

Figure 6:
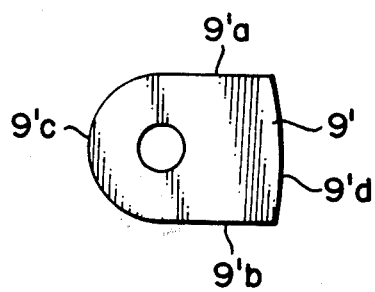
FIG. 6 is a plan view of an elastic element shown in FIG. 5.

While the elastic piece 9 is a ring in the embodiment of FIGS. 1-4, this form is not restrictive; an elastic element 9' formed as shown in FIGS. 5 and 6 may substitute for the elastic ring 9. The elastic piece 9' has a cross section of the same orthogonal form or outline as the groove 8 in the thickness direction of the inner frame 1. In FIG. 6, 9'a, 9'b represent the straight parallel side edges of the elastic piece 9', and 9'c, 9'd represent arcuately curved ends of elastic piece 9'. The portions 9'a, 9'b and 9'c of the elastic piece 9 are in close contact with the inside faces 8'a, 8'b and 8'd of the groove 8 (FIG. 5). Thus, when the elastic piece 9 is compressed to deform, the lateral deformation of the elastic piece 9' toward the inner peripheral face 2a of the inner frame 2 is made larger.

The arcuately curved portion 9'd of the elastic piece 9' is opposed to the inner peripheral face 2a of the outer frame 2, and curves in an arc following the inner peripheral face 2a, so that the whole outside face of the elastic piece 9', when compressed in the thickness direction of the inner frame 1, can immediately come into close contact with the inner peripheral face 2a. As a result of this increased contact area with the inner peripheral face 2a of the outer frame when the elastic piece 9' is compressed, the inner frame 1 and the outer frame 2 can be fastened together with an increased reliability.

Figure 7:
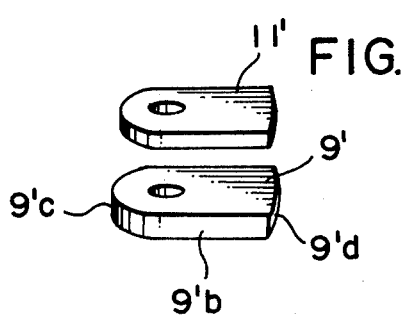
FIG. 7 is an oblique view of an elastic element and nut of another embodiment of the invention.

The nut 11 described above is a standard one, but it need not be. Instead of the nut 11, a flat nut 11' formed identical with the elastic piece 9', when relaxed, as illustrated in FIG. 7, can be employed to compress the elastic piece 9'. In that case, the elastic piece 9', when compressed in the thickness direction of the inner frame 1, will tend to expand only toward the inner peripheral face 2a of the outer frame 2, and accordingly, the fastening of the outer frame 2 to the inner frame 1 will be more reliable than in the versions of FIGS. 5 and 6.

As described above, the significant feature of the present invention is that an elastic piece held by the inner frame is compressible, and the elastic piece, when compressed, expands laterally to press against the inner peripheral face of the outer frame, thereby fixing the outer frame to the inner frame. Therefore, unlike the prior art stop screw and clamping washer arrangement, there is no likelihood of the inner frame being broken or the clamping washer biting into either the inner frame or the outer frame. Thus, the inner frame can be securely fixed to the outer frame; and depending on the compression of the elastic piece, the outer frame can be rotated relative to the inner frame and the operation of the outer frame is enhanced.

The clamping means according to the present invention is of course applicable to a dial gauge per se, as well as to measuring instruments such as a dial type calipers or a dial type height gauge, which use a dial gauge.

What is claimed is:

1. A measuring instrument comprising a tubular outer frame rotatably fitted around a circular inner frame, said outer frame having an inner peripheral face,
   a pointer rotatably supported by said inner frame,
   a scale plate attached to said outer frame for indicating the position of said pointer,
   said inner frame having a rear surface facing away from said scale,
   an elastic element having a portion thereof adjacent said inner peripheral face of said outer frame, and
   manually manipulable screw means to compress said elastic element in the direction of the axis of said inner frame, for causing said elastic element to expand laterally into engagement with said inner peripheral face to restrict rotation of the outer frame with respect to the inner frame, said screw means having a manipulator exposed on the rear surface of said inner frame.

2. The measuring instrument of claim 1, wherein said means for compressing comprises a bolt extending at least partially through said inner frame in said direction, and
   a nut engaging with said bolt,
   said elastic element being located between said nut and the inner frame.

3. The measuring instrument of claim 2, wherein said bolt has an exposed head which comprises said manipulator.

4. The measuring instrument of claim 2 or 3, further comprising
   a groove adjacent the periphery of said inner frame and opening toward the inner peripheral face of said outer frame,
   said nut and elastic element being disposed within said groove.

5. The measuring instrument of claim 4, wherein said groove has to inside faces parallel and opposed to each other,
   said nut has parallel outside faces, and
   said faces are closely adjacent to prevent rotation of the nut during rotation of the bolt.

6. The measuring instrument of claim 4, wherein
   said elastic element comprises a ring in engagement with a surface of the groove which faces toward the inner peripheral face of the outer frame.

7. The measuring instrument of claim 4, wherein said elastic element has a cross section of the same profile as an orthogonal section of said groove, and the periphery of the element is closely adjacent to an inner peripheral face of said groove.

8. The measuring instrument of claim 4, wherein said nut has a profile approximating the form of the orthogonal section of said groove and the periphery of said nut is closely adjacent an inner peripheral face of said groove.

9. The measuring instrument of claim 7, wherein an outside face of said elastic element which faces the inner peripheral face of said outer frame comprises an arc extending along the inner peripheral face of said outer frame.

10. The measuring instrument of claim 8, wherein an outside face of said nut which faces the inner peripheral face of said outer frame comprises an arc extending along the inner peripheral face of said outer frame.

* * * * *